(12) United States Patent
Seifert et al.

(10) Patent No.: US 6,250,586 B1
(45) Date of Patent: Jun. 26, 2001

(54) APPARATUS AND METHOD FOR CONTROLLING THE MOTION OF A SOLID BODY OR FLUID STREAM

(75) Inventors: Avi Seifert; Israel Wygnanski, both of Tel Aviv (IL)

(73) Assignee: Ramot University Authority for Applied Research and Industrial Development Ltd., Tel Aviv (IL)

(*) Notice: Subject to any disclaimer, the term of this patent is extended or adjusted under 35 U.S.C. 154(b) by 0 days.

(21) Appl. No.: 09/091,753
(22) PCT Filed: Dec. 29, 1996
(86) PCT No.: PCT/IL96/00194
  § 371 Date: Jun. 24, 1998
  § 102(e) Date: Jun. 24, 1998
(87) PCT Pub. No.: WO97/25623
  PCT Pub. Date: Jul. 17, 1997

(30) Foreign Application Priority Data

Jan. 3, 1996 (IL) .................................................. 116668

(51) Int. Cl.⁷ ............................................................. B64B 1/36
(52) U.S. Cl. .......................... 244/52; 244/73 R; 244/12.5; 60/230

(58) Field of Search ................................. 244/52, 73 R, 244/73 C, 12.5; 60/228, 230

(56) References Cited

U.S. PATENT DOCUMENTS

| | | | |
|---|---|---|---|
| 3,299,638 | * | 1/1967 | Santamaria et al. ................. 60/204 |
| 3,786,993 | * | 1/1974 | Burgess et al. ...................... 60/230 |
| 4,754,927 | * | 7/1988 | Fitzgerald ............................ 244/52 |
| 5,154,050 | * | 10/1992 | Herup et al. ......................... 60/230 |
| 5,706,650 | * | 1/1998 | Thayer .................................. 60/231 |

* cited by examiner

Primary Examiner—J. Woodrow Eldred
(74) Attorney, Agent, or Firm—Mark M. Friedman

(57) ABSTRACT

This invention discloses a fluid dynamic system including a fluid medium separated from a solid medium by a solid boundary, one of which media is moving with respect to the other, apparatus for controlling the motion of the moving medium, comprising, a perturbation-producing element at solid boundary, and a drive for cyclically driving the perturbation-producing element to produce cyclical fluid perturbations in the fluid medium sufficient to alter the motion of the moving medium. A method for including a fluid medium separated from a solid medium by a solid boundary in a fluid dynamic system is also disclosed.

27 Claims, 5 Drawing Sheets

APPARATUS AND METHOD FOR CONTROLLING THE MOTION OF A SOLID BODY OR FLUID STREAM

The present invention relates to apparatus and also to a method for controlling the motion of a solid or a fluid stream. As will be described more particularly below, the apparatus and method of the invention may be used to generate forces and moments on the moving medium in order to alter trajectory. The invention may also be used to effect thrust control, e.g., to augment thrust, of a self-propelled solid body.

U.S. Pat. No. 4,260,204, a joint inventor in which is also a joint inventor in the present application and which is hereby incorporated by reference, discloses a method and apparatus for enhancing the mixing of two fluids by providing flow perturbations near the origin of the mixing region about an axis substantially normal to the prevailing flow direction. Examples of possible uses of the technique described in that patent include promoting combustion in jet engines, suppressing audible jet noise, and increasing output of ejector pumps.

U.S. Pat. No. 5,244,203, the inventor in which is a joint inventor in the present application and the disclosure of which is also hereby incorporated by reference, discloses a method and apparatus for exploiting the technique of U.S. Pat. No. 4,257,224 to delay the separation of a boundary layer of a fluid flowing over a solid surface. Disclosed applications of the technique described in U.S. Pat. No. 5,209,438 include increasing the lift of a wing, while decreasing its drag, and also increasing the divergence angle of a diffuser.

The present application is directed to still other methods and apparatus for exploiting the mixing technique described in U.S. Pat. No. 4,257,224, particularly for controlling the motion of a solid body or of a fluid stream.

According to one aspect of the present invention, there is provided, in a fluid dynamic system including a fluid medium separated from a solid medium by a solid boundary, one of which media is moving with respect to the other, apparatus for controlling the motion of the moving medium, comprising: a perturbation-producing element at the solid boundary; and a drive for cyclically driving the perturbation-producing element to produce cyclical fluid perturbations in the fluid medium sufficient to alter the motion of the moving medium.

In some described embodiments, the moving medium is a solid body (the solid medium) which includes a combustion chamber having an exit nozzle through which a fluid jet is discharged, the cyclical fluid perturbations being generated at selected locations on the exit nozzle around its longitudinal axis to alter the motion of the solid body. Examples of this application of the method would include the control of the movements of solid bodies, such as aircraft, rockets, etc., moving through the air or space, and sea vessels moving through the water, and the like.

The invention may also be used to control the motion of a fluid medium with respect to solid boundaries, for example in order to divert the fluid stream or a part thereof to another path. Examples of this application of the method would include controlling the inlet flow, or internal flows in general, of a fluid medium used for cooling, combustion, or the like.

It will be appreciated that in most of the described embodiments the control can be effected continuously, by subdividing an actuator generating the perturbations into short segments, and by controlling the frequency and/or amplitude of the perturbations emanating from each segment. It is contemplated, however, that in some applications the control can be effected in an "on/off" manner.

According to a further aspect of the invention, there is provided apparatus for spreading the jet emanating from the entrance region of a short, wide angle nozzle providing efficient thrust recovery and thrust vectoring, the apparatus including cyclically driven perturbation-producing elements which generate periodic perturbations within the fluid, which perturbations are varied around the periphery of the nozzle to deflect the entire stream from its original direction thus achieving thrust vectoring, the jet deflection being proportional to the frequency and strength of the periodic perturbations.

The invention also provides a method for controlling the movement of a solid body or a fluid stream, in accordance with the foregoing apparatus.

Further features and advantages of the invention will be apparent from the description below.

The invention is herein described, somewhat diagrammatically and by way of example only, with reference to the accompanying drawings, wherein:

FIGS. 3b, 3c and 3d illustrate three examples of jet flow control achieved experimentally that may be applied to the perturbation-producing elements shown in FIG. 3a;

Figure 1:
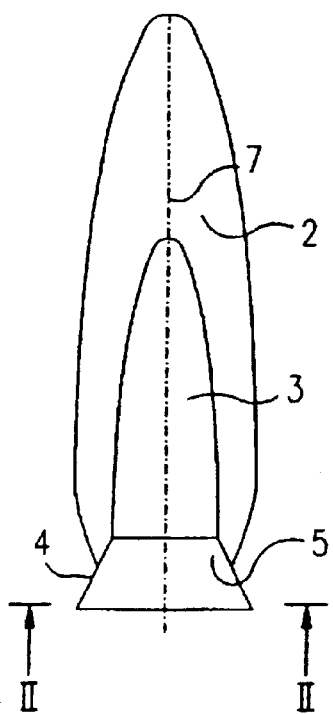
FIG. 1 is a block diagram schematically illustrating a self-propelled body constructed in accordance with the present invention.
Figure 2:
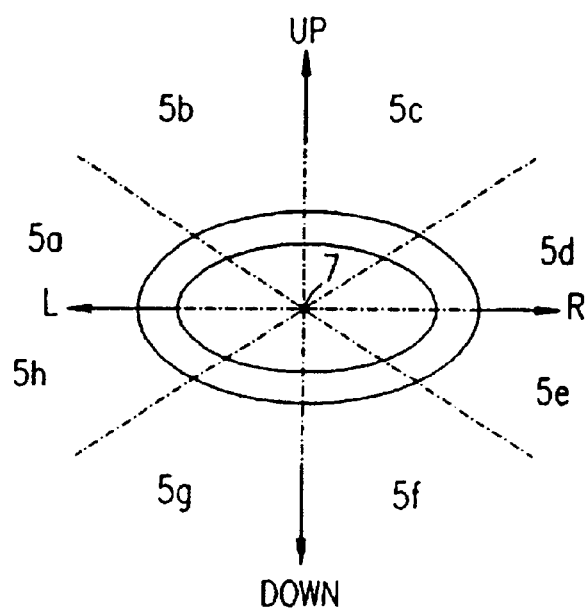
FIG. 2 is an end view of the body of FIG. 1.

With reference first to FIGS. 1–3, there is illustrated a self-propelled body (e.g., a submarine, a missile, etc.), generally designated 2, which is propelled by a jet exiting from a pressurized chamber 3 via a discharge nozzle 4. Directional control of the body is effected by deflecting or rotating the jet exiting from discharge nozzle 4 and causing full or partial flow reattachment to the nozzle wall to generate the required forces and moments.

In order to obtain directional control, a plurality of perturbation-producing elements 5, such as described in the above-cited U.S. Pat. No. 4,257,224 and 5,209,438, are located around the entrance to the discharge nozzle 4 and are selectively activated by a drive, generally designated 6, to control the direction of discharge of the jet from nozzle 4, and thereby the direction of movement of the body. As shown particularly in FIG. 3a, the walls of the discharge nozzle 4 diverge in the direction of streaming, as shown at 4a. The plurality of perturbation-producing elements 5 are located in one or more circumferential arrays, as shown in FIG. 2. In most cases, only one circumferential array located at the entrance to the diverging nozzle would be needed.

Figure 3A:
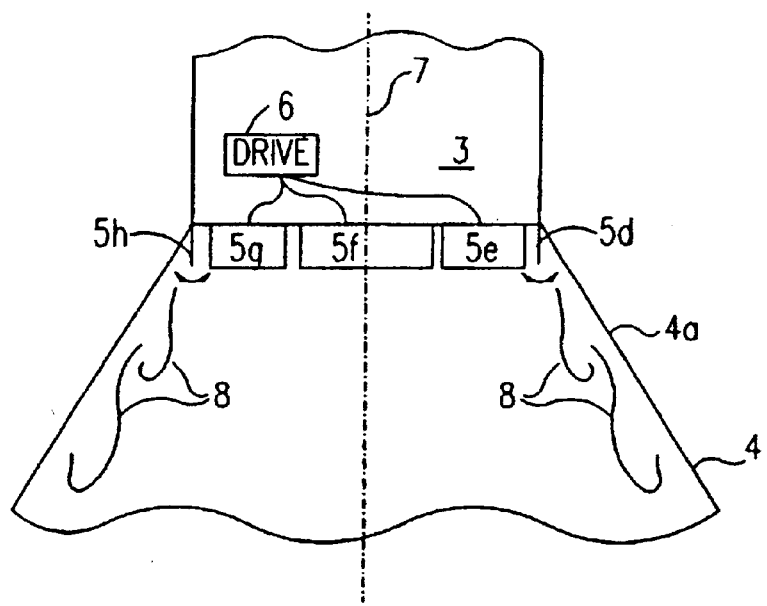
FIG. 3a is an enlarged fragmentary view of a portion of the body of FIG. 1 but with a circular array of perturbation-producing elements as shown in FIG. 7.

Each perturbation-producing element, as shown in FIG. 3a, is in the form of a small flap which is cyclically activated by drive 6 to oscillate towards and away from the axis of symmetry 7 of the system, such that each produces cyclical fluid perturbations or oscillations emanating from the solid boundary of the discharge nozzle 4 and into the jet discharged from the nozzle. These perturbations are in the form of vortices 8 extending azimuthally along the circumference and propagating downstream along the diverging wall 4a of the nozzle 4. The azimuthal extent of these vortices depends on the number of elements activated simultaneously, and on the strength and frequency of the perturbations generating them. The flow will attach to that part of the surface in which the vortices acquired sufficient strength (in intensity and size) but it will only deflect partially towards the surface whenever the strength of the vortices is insufficient to cause complete reattachment. Very weak perturbations, or perturbations of inadequate frequencies, will not affect the flow. Thus, by selectively controlling the perturbation-producing elements 5, a wide variety of controls may be effected.

FIG. 2 illustrates for purposes of example eight perturbation-producing elements 5a–5b arranged in an oval array around the longitudinal axis 7 of the exit nozzle 4. If all the perturbation-producing elements are activated, this will enhance both the spreading and the mixing of the exiting jet. When ambient fluid is present and the body shown in FIG. 1 generates "drag", the enhanced mixing will increase the pressure recovery and thrust efficiency of the jet, thereby augmenting the thrust produced by the discharged jet and will also reduce the base drag.

Directional control can be effected by selective activation of the perturbation-producing elements 5a–5h in FIG. 2, as follows: Activation of elements 5b and 5c will deflect the jet upward; activation of elements 5f and 5g will deflect the jet downward; activation of elements 5a and 5h will deflect the jet to the left; and activation of opposing elements 5d and 5e will deflect the jet to the right. Simultaneous activation of certain elements, such as elements 5c and 5g, or 5b and 5f, will generate a moment around the longitudinal axis 7 to produce a roll and will also swirl the jet.

The above forces and moments will be proportional to the magnitude and frequency of the perturbations. Thus, the perturbation-producing elements 5a–5h can be controlled in an on/off manner, they can also be controlled continuously by changing the input frequency and/or amplitude of the oscillations. Reducing the amplitude of any combination of elements as described above will deflect or rotate the jet in the opposite direction. The oscillation frequency should be in the range such that the dimensionless frequency $F=f*L/U_j=0.5$ to 3 where f is the forcing frequency, L is the length of the diverging part of the nozzle and $U_j$ is approximately the mean flow velocity in the nozzle.

Figure 3B:
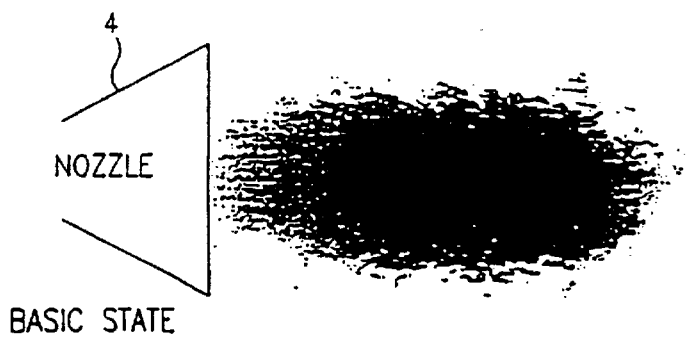
Figure 3C:
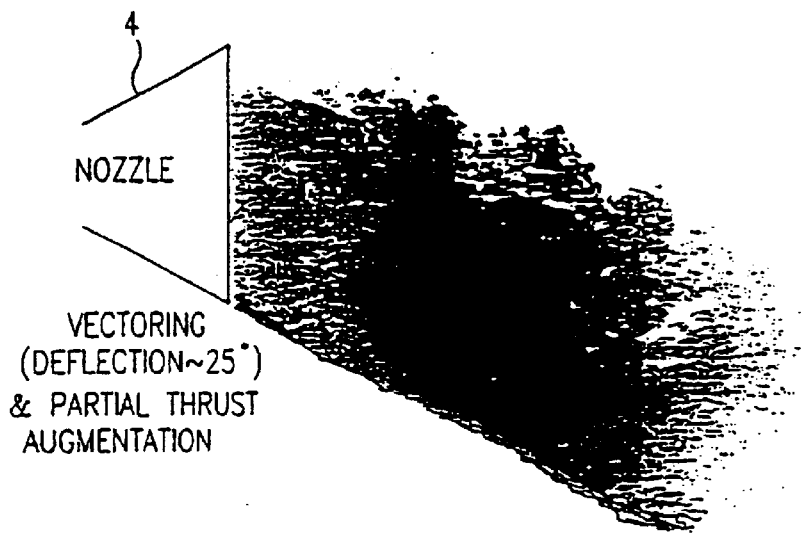
Figure 3D:
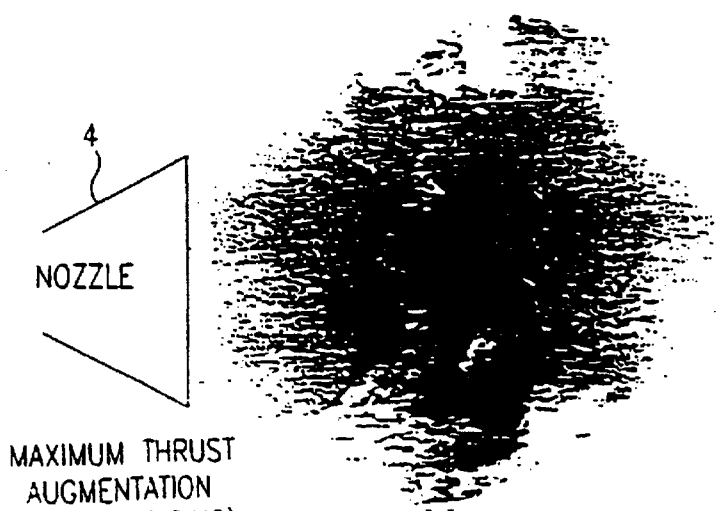

FIGS. 3b–3d show how the jet discharged from the nozzle 4 is controlled. FIG. 3b illustrates the jet flow when none of the perturbation-producing elements 5a–5h is activated, this being the basic state without perturbations. FIG. 3c illustrates the jet flow when the lower perturbation-producing elements (e.g., 5e–5h) are activated, thereby producing vectoring, resulting in a jet deflection of about 25° in the example illustrated; the jet flow illustrated in FIG. 3c also produces some additional spreading of the discharge jet, thereby producing a partial thrust augmentation. FIG. 3d illustrates the jet flow when all the perturbation-producing elements, e.g., 5a–5h, are activated, thereby producing maximum spreading, resulting in maximum thrust augmentation.

The perturbation-producing elements 5 may take other forms. For example, the above-cited U.S. Pat. No. 5,209,438, illustrates perturbation-producing elements including: a pivotal flap oscillated by a cam rotated by a drive against the force of a spring; a plate or ribbon located substantially parallel to the surface of a wing carrying such element and reciprocating towards and away from the wing surface by a drive; an obstruction located substantially perpendicular to the upper surface of a wing and reciprocated by a drive in and out of a recess; and a rotating vane projecting slightly above the upper surface of a wing and rotated by a drive.

Figure 4:
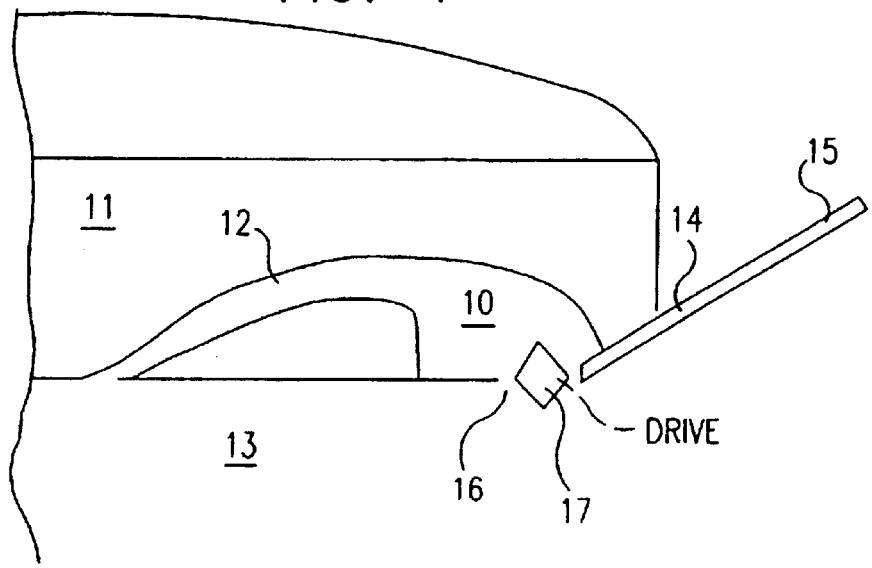
FIG. 4 is a fragmentary view illustrating another form of perturbation-producing element that may be used for controlling the direction of the body.
Figure 5:
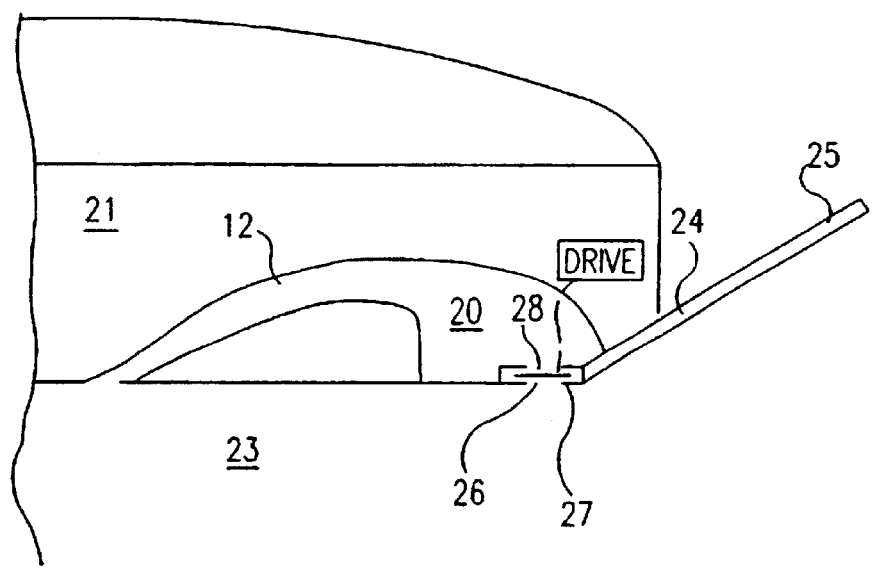
FIG. 5 illustrates another type of perturbation-producing element that may be used.
Figure 6:
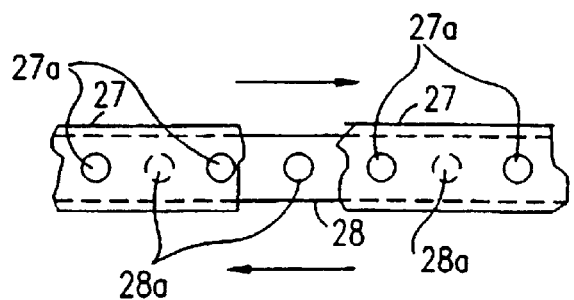
FIG. 6 is an enlarged fragmentary view more particularly illustrating the structure and movement of the perturbation-producing elements of FIG. 5.

FIGS. 4–6 illustrate further constructions of perturbation-producing elements that may be used.

The perturbation-producing element shown in FIG. 4 is in the form of a chamber 10 within the controlled body 11 (e.g., aircraft, missile, sea vessel, etc.) which is pressurized, e.g., by a passageway 12 leading to a pressure source located elsewhere, e.g., either in or out of the combustion chamber 13. In this case, the entrance end of the divergent wall 14 of the discharge nozzle 15 is formed with an opening 16 communicating with the pressurized chamber 10. Opening 16 is cyclically restricted and enlarged by a rotating bar 17 of non-circular cross-section (shown by way of example of substantially square cross-section) which is rotated in opening 16. Thus, by rotating bar 17 within opening 16, the spaces on opposite sides of the valve member are cyclically restricted and enlarged, to produce the perturbations or oscillations which form the vortices described above which propagate along the inside of the diverging wall 14 of the discharge nozzle 15, to reattach the flow to the nozzle wall 14, and thereby to divert the jet and to control the movement of body 11 as described above with respect to FIGS. 1–3.

FIGS. 5 and 6 illustrate another form of perturbation-producing system which may be used. In this case, the perturbation-producing element is also in the form of a chamber 20 (which may be further subdivided to smaller chambers arranged around the circumference of the nozzle and pressurized individually to different levels), in the body 21 being controlled and pressurized by a passageway 22 communicating with a pressure source (such as a combustion chamber 23, or a compressor). As described above with respect to FIG. 4, the pressurized chambers 20 are also at the entrance of the divergent wall 24 of the discharge nozzle 25 and communicate via openings 26 with the nozzle. This opening is cyclically enlarged and restricted to produce the required perturbations. In this case, however, the perturbations are produced by momentary jets issued perpendicularly to the fixed member 27 formed with a plurality of openings 27a, and a reciprocating member 28 also formed with a plurality of openings 28a. The arrangement is such that as member 28 slides back and forth, or moves in one direction around the periphery of the nozzle, openings 28a are cyclically moved in and out of alignment with openings 27a in the fixed member 27, to thereby cyclically produce jets of controlled strength from the pressurized chambers 20. These generate vortices which propagate downstream along the inner surface of the diverging wall 24 of the discharge nozzle 25.

Figure 7:
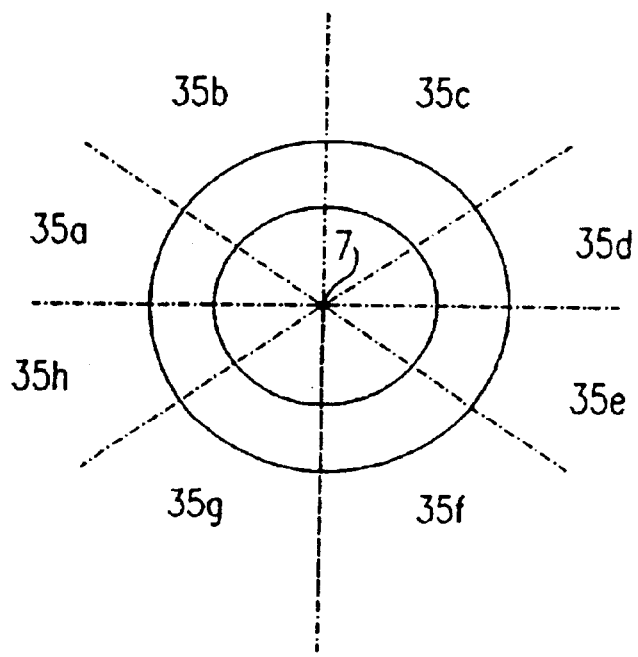
FIGS. 7 and 8 are end views similar to that of FIG. 2 but illustrating circular and rectangular arrays, respectively, of perturbation-producing elements instead of the oval array in FIG. 2.
Figure 8:
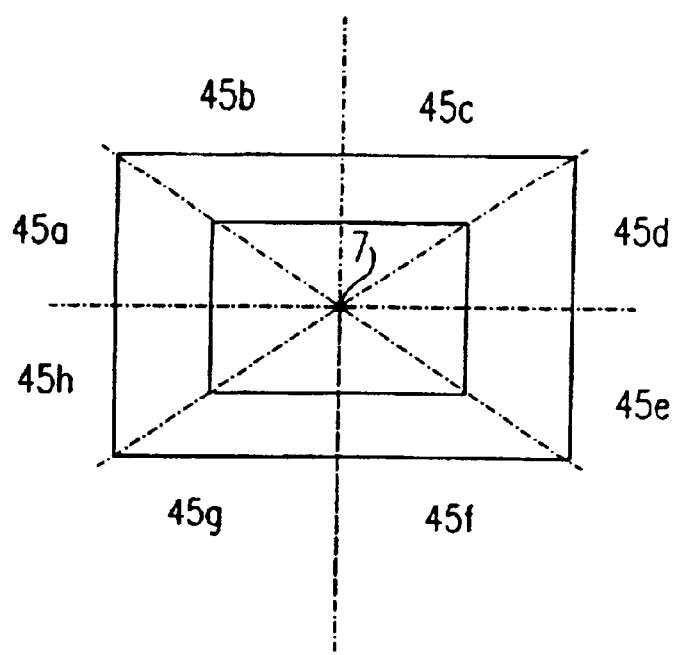

FIG. 7 illustrates a variation wherein the plurality of perturbation-producing elements, therein designated 35a–35h, are arranged in a circular array, rather than in an oval array (FIG. 2); and FIG. 8 illustrates a variation wherein the perturbation-producing elements, therein designated 45a–45h are arranged in a rectangular array. In both cases, the perturbation-producing elements may be controlled as described above to produce the enhanced spreading of the discharge jet, and/or to provide the directional and/or rotational control of the fluid jet, and thereby of the solid body, as described above with respect to FIGS. 1–3.

Figure 9:
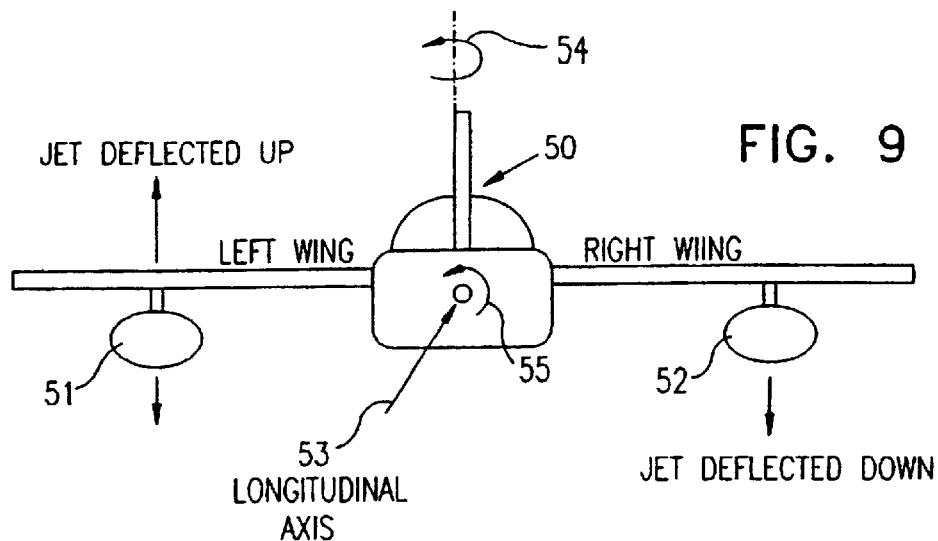
FIG. 9 is an end view schematically illustrating a winged system constructed in accordance with the present invention and containing more than a single propulsion.

FIG. 9 illustrates the application of the invention to a multi-jet-propelled system generally designated 50, including jet sub-systems (e.g., engines) 51, 52, in the two wings on the opposite sides of the longitudinal axis 53 of the system. The two jet sub-systems 51, 52 can be constructed and controlled as described above in order to produce a differential jet deflection for controlling the roll 55 around the longitudinal axis of the system 53. Changing the entire rate of spread of the jets from either engine 51 or 52, differentially changes the thrust generated by the jets from those engines and produces a yawing moment around the vertical axis 54.

Figure 10:
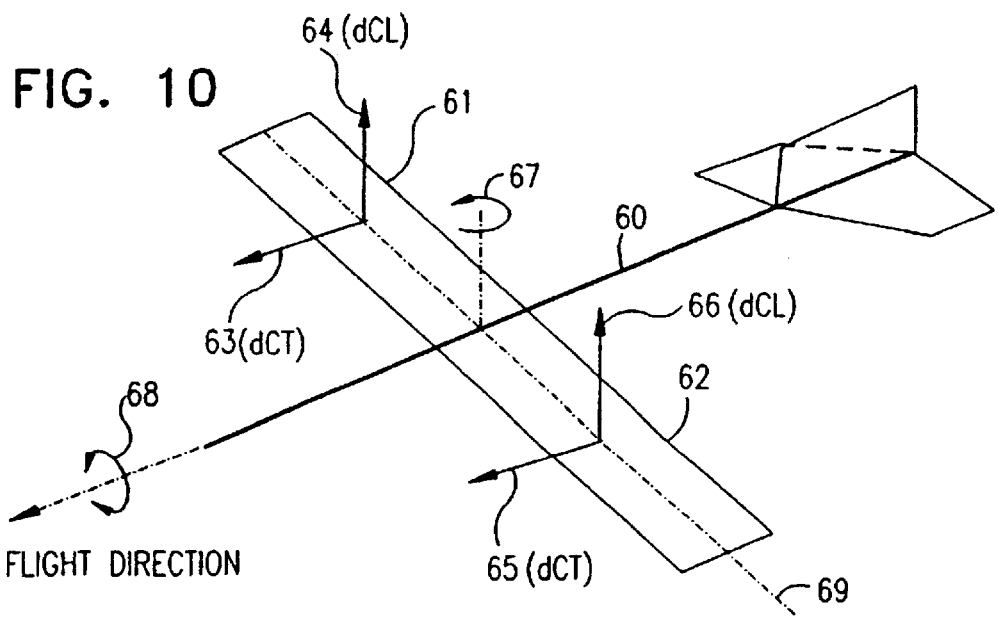
FIG. 10 is a diagram illustrating another form of winged system constructed in accordance with the present invention.

FIG. 10 illustrates the invention also applied to a winged system, generally designated 60. Here, the perturbation-producing elements are applied to one or both wings, as shown at 61 and 62, respectively, and are controlled so as to produce more or less lift dCL (64), and more or less thrust dCT (63), and thereby to roll around axis 68, and/or to yaw about axis 67.

Whereas in the above-described embodiments, the perturbation-producing elements are shown as being applied to a body moving in air, it will be appreciated that the invention could also be applied to a body (such as a ship, submarine, etc.) moving in water on in space (rockets, satellites equipped with control jets), to control their motion, translatory and/or rotational, in the same manner as described above.

Figure 11:
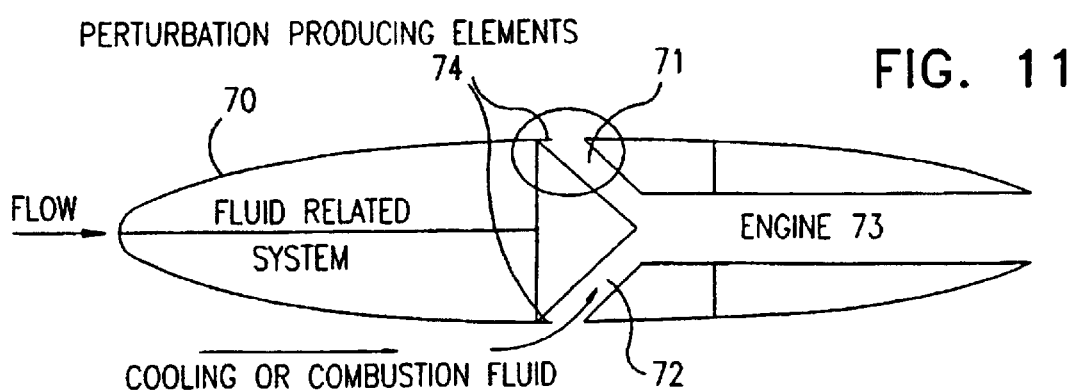
FIG. 11 schematically illustrates the invention as embodied in a system for controlling the flow of a fluid, e.g., for combustion or cooling purposes, into a sub-system, for example, an engine.

FIG. 11 illustrates a further application of the invention for controlling the direction of flow of a fluid medium with respect to a solid body, such as a fluid stream flowing through a main pathway defined by the solid body. Thus, FIG. 11 illustrates the solid boundary, generally designated 70, having flush-mounted inlet ducts 71, 72, for letting in a fluid for cooling, or combustion purposes into an engine 73 (or other interior sub-system). By providing the perturbation-producing element, generally designated 74, at the inlet end of one or both of the ducts 71, 72, the perturbations produced by the cyclically driven elements will reduce or eliminate the separation bubbles which normally are generated near the sharp corners of the inlet ducts. This will deviate more of the fluid flow into the controlled ducts and will thereby increase the flow rate into the controlled ducts.

While the invention has been described with respect to several preferred embodiments, it will be appreciated that these are set forth merely for purposes of example, and that many other variations, modifications and applications of the invention may be made.

What is claimed is:

1. In a fluid dynamic system including a fluid medium separated from a solid medium by a boundary, one of which media moves with respect to the other, an apparatus for controlling the motion of the moving medium, comprising:
   (a) a perturbation-producing element at said boundary; and
   (b) a drive for cyclically driving said perturbation-producing element to produce cyclical fluid perturbations in the fluid medium sufficient to alter the motion of the moving medium.

2. The apparatus of claim 1, wherein the moving medium is a solid body which includes a chamber selected from the group consisting of a combustion chamber and a pressurized chamber, said chamber having an exit nozzle wherethrough a fluid jet is discharged, there being a plurality of said perturbation producing elements at selected locations on said exit nozzle around an axis thereof to alter the motion of the moving medium.

3. The apparatus of claim 2, wherein said exit nozzle includes an entrance end having a diverging wall, and wherein said plurality of said perturbation-producing elements are located in said diverging wall at said entrance end of said exit nozzle.

4. The apparatus of claim 1, wherein the moving medium is a fluid stream flowing through a main pathway defined by the solid medium and joined to an inlet of a secondary pathway, said perturbation-producing element being located on the solid medium at said inlet to divert at least a part of the moving medium from said main pathway to said secondary pathway.

5. The apparatus of claim 4, wherein said main pathway is defined by an outer surface of the solid medium, said inlet of said secondary pathway being flush with said outer surface of the solid medium.

6. The apparatus of claim 1, wherein said perturbation-producing element includes a cyclically oscillated flap.

7. The apparatus of claim 1, wherein said perturbation-producing element includes a cyclically restricted and enlarged opening between a pressurized chamber in said solid body and said fluid medium.

8. The apparatus of claim 7, wherein said opening is cyclically restricted and enlarged by a rod of non-circular cross-section acting as a valve member and rotated in said opening.

9. The apparatus of claim 7, wherein said opening is cyclically restricted and enlarged by a member formed with an aperture, which member is cyclically driven to bring said aperture into and out of alignment with said opening.

10. An apparatus for producing perturbations in a boundary between a solid body and a fluid medium, comprising:
    (a) a chamber in said solid body having an opening communicating with the fluid medium;
    (b) means for pressurizing said chamber; and
    (c) means for cyclically restricting and enlarging said opening to produce the perturbations in the fluid medium.

11. The apparatus of claim 10, wherein said opening is cyclically restricted and enlarged by a valve member of non-circular cross section rotated in said opening.

12. The apparatus of claim 10, wherein said opening is cyclically restricted and enlarged by a member formed with an aperture, which member is cyclically driven to bring said aperture into and out of alignment with said opening to produce said perturbations.

13. An apparatus for deflecting a jet emanating from an entrance region of a short, wide-angle nozzle to provide efficient thrust recovery and thrust vectoring, comprising a plurality of cyclically driven perturbation-producing elements, disposed around a periphery of the nozzle, and operative to generate periodic perturbations within the jet.

14. In a fluid dynamic system including a fluid medium separated from a solid medium by a boundary, one of which media moves with respect to the other, a method of controlling motion of the moving medium, comprising the steps of:
    (a) providing a mechanism in the boundary for generating cyclical flow perturbations sufficient to alter the motion of the moving medium; and
    (b) generating said cyclical flow perturbations.

15. The method of claim 14, wherein said perturbations produce translatory forces acting on the moving medium.

16. The method of claim 14, wherein said perturbations produce moments acting on the moving medium.

17. The method of claim 14, wherein the moving medium is a solid body which includes a chamber selected from the group consisting of a combustion chamber and a pressurized chamber, said chamber having an exit nozzle wherethrough a fluid jet is discharged, there being a plurality of said perturbation producing elements at selected locations on said exit nozzle around an axis thereof to alter the motion of the moving medium.

18. The method of claim 17, wherein said exit nozzle includes an entrance end having a diverging wall, said cyclical flow perturbations being generated in said diverging wall at said entrance end of said exit nozzle.

19. The method of claim 14, wherein the moving medium is a fluid stream moving through a main pathway defined by the solid medium and joined to an inlet of a secondary pathway, said cyclical flow perturbations being generated at said inlet to divert at least a part of said fluid stream from said main pathway to said secondary pathway.

20. The method of claim 19, wherein said main pathway is defined by an outer surface of the solid medium, said inlet of said secondary pathway being flush with said outer surface of the solid medium.

21. The method of claim 14, wherein said mechanism includes at least one flap, said perturbations being generated by cyclically oscillating said at least one flap.

22. The method of claim 14, wherein said mechanism is operative to generate said perturbations by cyclically restricting and enlarging an opening establishing fluid communication between a pressurized chamber in the solid medium and the fluid medium.

23. The method of claim 22, wherein said cyclical restricting and enlarging of said opening is effected by rotating a rod of non-circular cross section in said opening, said rod thereby acting as a valve.

24. The method of claim 22, wherein said cyclical restricting and enlarging of said opening is effected by reciprocating a member formed with an aperture so that said aperture is brought into and out of alignment with said opening.

25. A method for producing cyclical flow perturbations in a fluid medium flowing along a boundary between a solid body and the fluid medium, comprising the steps of:

(a) providing the solid body with a chamber having an opening communicating with the fluid medium;

(b) pressurizing said chamber; and (c) cyclically restricting and enlarging said opening to produce the cyclical flow perturbations in the fluid medium.

26. The method of claim 25, wherein said cyclical restricting and enlarging is effected by rotating a rod of non-circular cross-section in said opening, said rod thereby acting as a valve.

27. The method of claim 25, wherein said cyclical restricting and enlarging is effected by reciprocating a member formed with an aperture so that said aperture is brought into and out of alignment with said opening.

* * * * *